J. H. HENDERSON.
WATER RAISING APPARATUS.
APPLICATION FILED JAN. 6, 1914.
1,145,482.
Patented July 6, 1915.
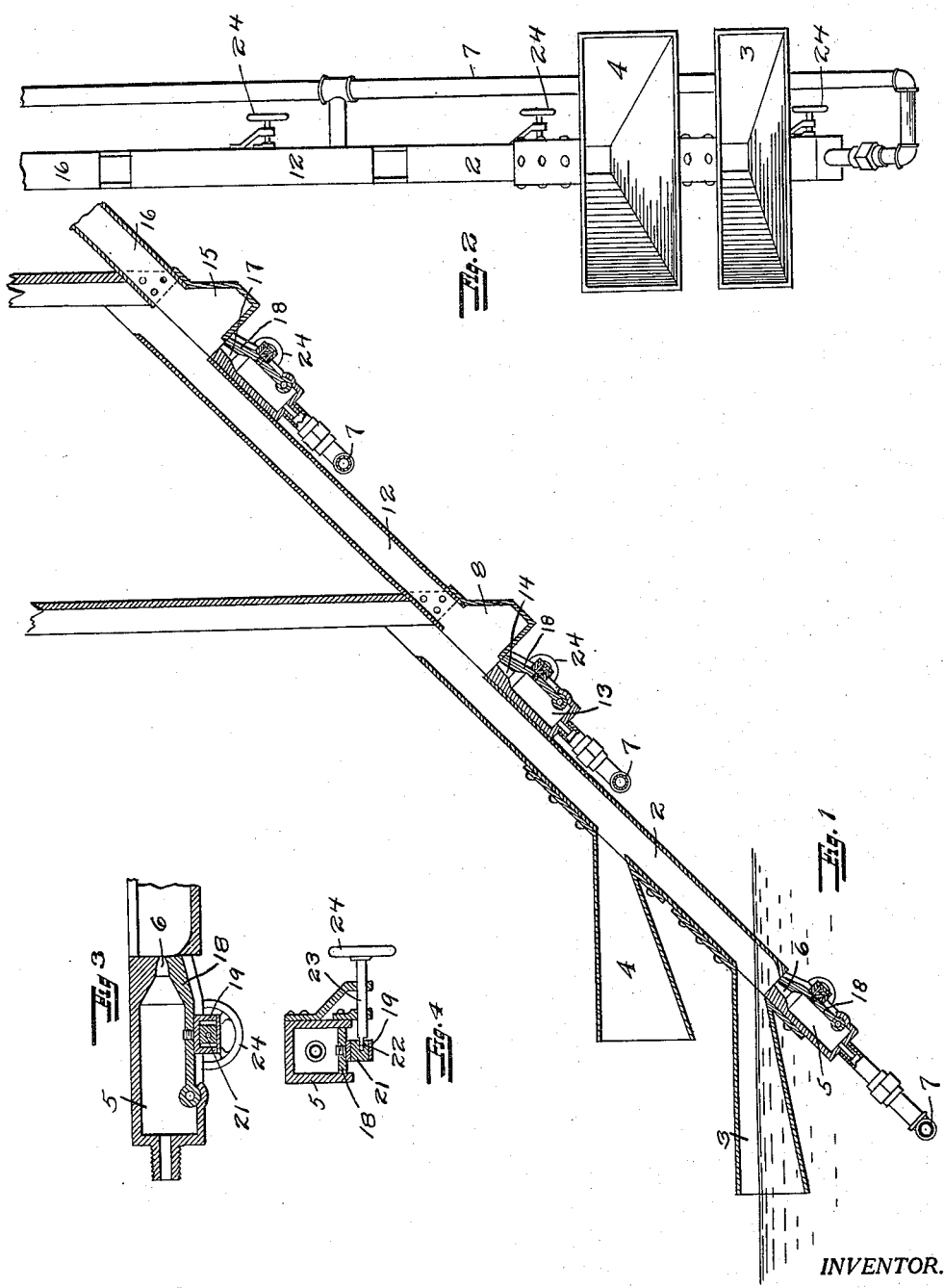
WITNESSES:
J. B. Gardner.
INVENTOR.
JOHN H. HENDERSON
BY White & Frost
HIS ATTORNEYS.

UNITED STATES PATENT OFFICE.

JOHN H. HENDERSON, OF EAST OAKLAND, CALIFORNIA.

WATER-RAISING APPARATUS.

1,145,482.  Specification of Letters Patent.  Patented July 6, 1915.

Application filed January 6, 1914. Serial No. 810,536.

*To all whom it may concern:*

Be it known that I, JOHN H. HENDERSON, a citizen of the United States, and a resident of East Oakland, county of Alameda, and State of California, have invented certain new and useful Improvements in Water-Raising Apparatus, of which the following is a specification.

The invention relates to apparatus for raising water, particularly from large natural bodies of water along the shore line.

The object of the invention is to provide an apparatus which utilizes the kinetic energy in waves or breakers for raising the water therein above the level of the body of water on which the waves or breakers occur.

Another object of the invention is to provide an apparatus for raising water to any height by means of a series of jets of compressed air.

The invention possesses other advantageous features, which, with the foregoing, will be set forth at length in the following description where I shall outline in full that form of the invention which I have selected for illustration in the drawings accompanying and forming part of the present specification.

The novelty of the invention will be included in the claims succeeding said description. From this it will be apparent that I do not limit myself to the showing made by said drawings and description, as I may adopt many variations within the scope of my invention as set forth in said claims.

Referring to the drawings: Figure 1 is a sectional elevation of the apparatus of my invention. Fig. 2 is a front view of the apparatus. Fig. 3 is a longitudinal section of one form of the compressed air chamber and nozzle which I may employ. Fig. 4 is a cross section of the compressed air chamber.

The apparatus of my invention is designed to be erected so that the lower part thereof lies in the surf or in the region of waves or breakers, so that the kinetic energy of the waves or breakers may be utilized in assisting to raise the water. The water is elevated in stages, and in the first stage the kinetic energy of the breakers supplements the raising effect of a jet of compressed air, and in the other stages compressed air alone is employed.

The apparatus comprises a series of backwardly inclined conduits, the successive conduits, proceeding upwardly, being placed slightly below the preceding conduit, so that the water is raised in steps or stages. The lowermost conduit 2 is immersed at its lower end in the water to be raised so that the water flows directly into the conduit. The conduit slopes upward and backward at a suitable angle, and is provided at its lower end with two diverging mouths or intakes 3 and 4, arranged one above the other. The lower mouth 3 is partly immersed in the water, and other than serving as an intake for the water, collects portions of the waves or breakers and directs them into the conduit. The upper mouth 4 lies above the normal level of the water, but within the region of the waves or breakers, and directs a portion of the breakers into the conduit. On account of the diverging sides of the mouths and their inclined bottoms, the water is delivered to the conduit at a considerable velocity and in an upward direction, and the kinetic energy therein causes the water to be carried to a considerable height in the conduit.

Arranged at the lower end of the conduit, below the inlet of mouth 3, is a chamber 5 having a constricted opening 6 axially alined with the conduit. Compressed air is conducted into said chamber through the pipe 7 and discharges in a jet from the nozzle, and operates to raise the water to a higher level than the kinetic energy of the waves alone would. The conduit 2 extends to the height to which the compressed air and the waves will raise the column of water, at which point it terminates. The water thus raised pours into a pocket 8 arranged beneath the upper end of conduit 2, and the air passes out through the open end of the conduit, thereby completing one stage in the elevating process. Arranged preferably parallel with the conduit 2, with its axis slightly lower than the axis of conduit 2, is an inclined conduit 12, through which the water passes in its second stage of elevation. An air chamber 13 and nozzle 14, similar to chamber 5 and nozzle 6, is arranged in axial alinement with conduit 12 and is supplied with compressed air from the pipe 7. This nozzle 14 is arranged at the lower side of the pocket 8 and the jet of air issuing therefrom raises the water therethrough, whence it is discharged into the pocket 15, with which is associated an inclined conduit 16 and the air nozzle 17, as before described. The number of these steps or stages may be increased to any desired number and depends upon the height of each stage and the height to which the water is to be raised.

Means are provided for varying the area of the air jet issuing from the nozzle, and in the drawings I have shown one form of these means, but it is to be understood that other forms may be employed. One side 18 of the air chamber 5 is pivoted at its rear end to the air chamber casing, so that it may be moved about said pivot to vary the size of the nozzle opening. Attached to the movable side 18 is a frame 19 in which is arranged a block 21 of such shape that it may slide longitudinally in the frame. Bearing in the block 21 is a pin 22 formed eccentrically on the end of shaft 23, which is mounted in suitable bearings and which is provided with a hand wheel 24 so that it may be readily rotated. A movement of the hand wheel will cause the side 18 to rock on its pivot, thereby varying the area of the nozzle. The end of the movable side 18 bears snugly against the lower end of the conduit, forming a substantially tight joint and preventing excessive leakage.

I claim:

1. In an apparatus of the character described, a plurality of inclined conduits arranged successively at higher levels, the successive higher conduit being arranged so that its axis lies below the axis of the next lower conduit, whereby each conduit may discharge into the successively higher conduit, and means for introducing a jet of air at the lower end of each conduit.

2. In an apparatus of the character described, a plurality of inclined conduits progressing upwardly in a step by step relation, the lower end of each conduit being arranged below the upper end of the conduit next below, and means for introducing a jet of compressed air at the lower end of each conduit.

3. In an apparatus of the character described, a plurality of inclined conduits progressing upwardly in a step by step relation, the lower end of each conduit being provided with a pocket arranged below the open upper end of the next lower conduit, an air nozzle alined with each conduit arranged at the lower end thereof, and means for varying the area of said nozzle.

4. In an apparatus of the character described, an inclined conduit, a flaring mouth arranged at the lower end of said conduit, the lower side of said mouth lying below the level of the water to be raised, a second flaring mouth arranged above said first named flaring mouth, and means for introducing air into said conduit below the level of said water.

In testimony whereof, I have hereunto set my hand at San Francisco, California, this 30th day of December, 1913.

JOHN H. HENDERSON.

In presence of—
  H. G. PROST,
  A. MURPHY.

Copies of this patent may be obtained for five cents each, by addressing the "Commissioner of Patents, Washington, D. C."